Feb. 12, 1929.
J. DAMM
1,702,201
LOCK FOR EMERGENCY BRAKE LEVERS
Filed May 23, 1928
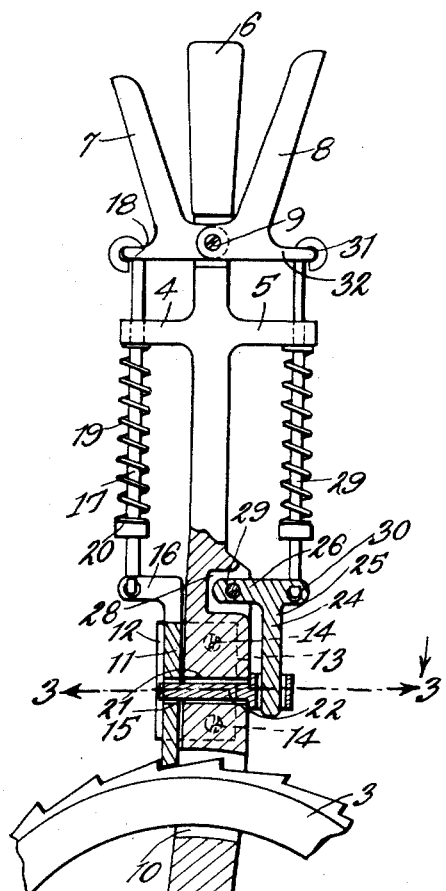
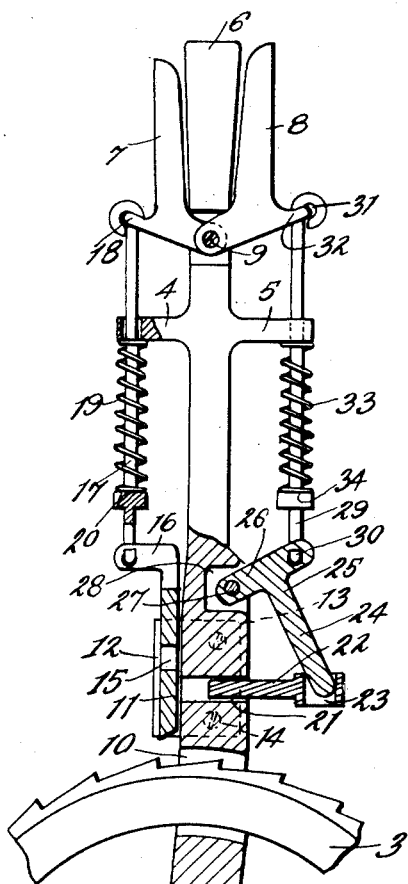
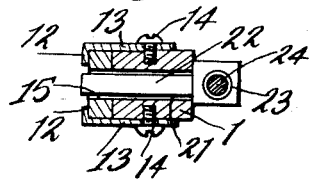
John Damm
INVENTOR
BY Victor J. Evans
ATTORNEY Patented Feb. 12, 1929.

1,702,201

UNITED STATES PATENT OFFICE.

JOHN DAMM, OF BROCKTON, PENNSYLVANIA.

LOCK FOR EMERGENCY BRAKE LEVERS.

Application filed May 23, 1928. Serial No. 279,975.

In various fields of machinery such as hoisting mechanisms, derrick mechanisms, or any contrivance where a lever corresponds with a toothed rack, and more especially on automobiles, levers to be locked are used.

Particularly emergency brake levers on automobiles should be locked to prevent the vibration of the body of the automobile causing the lever to release, therefore it is the purpose of the present invention to provide an improved lock for holding the lever against movement in either direction.

Another purpose is to provide a lock, wherein a sliding detent or member may be used in connection with a toothed rack to prevent movement of the levers in one direction, in combination with a laterally movable bolt to lock the slide in position, and thereby prevent movement of the lever in the opposite direction.

It is to be understood that the particulars herein given are in no way limitive, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:—

Figure 1—is a view in side elevation with part of the lever in section, the slide partly in section and the locking means for the slide in section, showing the lever locked.

Figure 2—is a similar view showing the lever unlocked, the detent slide being held unlocked, whereby the lever can be moved in either direction.

Figure 3—is a detailed sectional view on line 3—3 of Figure 1.

Referring to the drawings, 1 identifies a lever which may be of any proportions and preferably constructed of metal, and which is mounted upon a pivot 2. This lever at its lower end may connect with any suitable brake bands, or any other shoes or the like which may be used in connection with hoisting drums or similar devices. A toothed rack 3 is provided, concentric with the pivot 2, and the upper part of the lever is provided with lateral guides 4 and 5 and a handle 6 and hand grips 7 and 8, the latter being pivoted at 9 a little below the handle.

The lever has a transverse opening 10 through which the rack 3 engages.

A slide 11 is mounted in guides 12 which are secured to the sides of the lever. The guides are in form of plates 13, the flanges of which act as the guides. These plates are secured at 14 to the sides of the lever as shown in Figure 3. The slide 11 has an opening 15 therein and a lateral arm 16. A link 17 connects the lateral arm 16 and a projection 18 of the hand grip 7. The link or rod passes through the arm 4 of the lever, and a coil spring 19 is mounted upon the link or rod 17 between the arm 4 and a shoulder 20 on the link. The spring 19 constitutes means to bear upon the shoulder 20 to hold the slide 11 in engagement with the rack 3 which is curved concentric with the pivot 2. When the slide 11 is engaged with the teeth of the rack 3 movement of the lever in one direction is prevented. When the slide 11 is removed from engagement with the teeth, it is possible to move the lever 1 in either direction.

The lever has a transverse opening 21 through which a pin or locking device 22 passes. This pin or locking device has an opening 23 in its head, and engaged through the opening is an arm 24 of an oscillating member 25. The arm 26 of the oscillating member 25 is pivoted at 27 in a recess 28 of the lever. A rod 29 is pivoted at 30 to another arm of the oscillating member 25 and passes through the lateral arm 5 and is connected at 31 to a projection 32 of the hand grip 8. A coil spring 33 surrounds the rod 29 and is interposed between the arm 5 and a shoulder 34, so that the spring will act to restore the oscillating member 25 to its normal position as shown in Figure 1.

In the operation when it is desired to move the lever the hand grip 8 is pressed toward the handle 6, thereby pulling upon the rod 29 tightening the oscillating member 25, and therefore removing the bolt or pin 22 from the opening 15 of the slide, thereby making it possible to press the hand grip 7 toward the handle and remove the slide from engagement with the teeth of the rack allowing the lever to be moved in any direction. However when the slide is removed from engagement with the teeth the hand grip 8 may be released, in which case the pin or bolt 22 will rest against the face of the slide. When the slide is released and allowed to move toward the teeth of the rack, the pin or bolt may be released so as to bear against one face of the slide, until the opening 15 registers with the opening 21, in which case the pin or bolt 22 will engage with the opening 15 and hold the slide in engagement with the teeth or rack.

The invention having been set forth, what is claimed is:—

1. The combination with an emergency brake lever having an opening, of a rack engaged through the opening, guides carried by the brake lever, a slide mounted in the guides, said brake lever and the slide having registering openings, a bolt or pin mounted in the second opening of the brake lever and adapted to enter the opening in the slide to hold the slide in engagement with the teeth of the rack, an oscillating member pivoted on the brake lever and operatively engaged with the bolt or pin, means under tension and connected with the oscillating member to hold the bolt or pin in engagement with the slide, means to actuate the tension means to within the bolt or pin from the slide, and hand grip operating means to withdraw the slide from engagement with the teeth when the slide is released.

2. The combination with a pivoted lever, of a rack engaged through the lever, guides on the lever, a slide mounted in the guides and being spring tensioned to move the slide toward the teeth of the rack, said lever and the slide having registering openings, a bolt mounted in the opening of the lever and to pass through the opening of the slide to hold the latter in engagement with the teeth, hand grip operative means operatively connected with the bolt to withdraw it from engagement with the slide permitting the slide to disengage from the teeth of the rack, and hand grip means connected with the slide and movable against the action of the slide, tensioning means to withdraw the slide from the teeth of the rack when the slide is released.

In testimony whereof he affixes his signature.

JOHN DAMM.